United States Patent
Alexander, Jr. et al.

[19]

[11] Patent Number: 5,949,753
[45] Date of Patent: Sep. 7, 1999

[54] REDUNDANT INTERNET PROTOCOL GATEWAYS USING LOCAL AREA NETWORK EMULATION

[75] Inventors: Cedell Adam Alexander, Jr.; John Lloyd, both of Durham; Matthew Blaze Squire, Raleigh, all of N.C.

[73] Assignee: International Business Machines Corporation, Armonk, N.Y.

[21] Appl. No.: 08/826,864

[22] Filed: Apr. 11, 1997

[51] Int. Cl.[6] .................................. H04J 1/06; H04J 3/16
[52] U.S. Cl. ............................................ 370/216; 370/465
[58] Field of Search .................................. 370/216, 217, 370/218, 219, 225, 351, 395, 397, 399, 465, 400, 401; 395/200.1, 200.02, 200.11, 180, 181, 182.01

[56] References Cited

U.S. PATENT DOCUMENTS

| | | | |
|---|---|---|---|
| 5,394,402 | 2/1995 | Ross ........................................ | 370/94.1 |
| 5,450,406 | 9/1995 | Esaki et al. ............................. | 370/60.1 |
| 5,473,599 | 12/1995 | Li et al. ................................... | 370/16 |
| 5,485,455 | 1/1996 | Dobbins et al. ........................ | 370/60 |
| 5,570,084 | 10/1996 | Ritter et al. ........................ | 340/825.05 |
| 5,600,644 | 2/1997 | Chang et al. ........................... | 370/404 |
| 5,732,071 | 3/1998 | Saito et al. .............................. | 370/401 |
| 5,734,824 | 3/1998 | Choi .................................. | 395/200.11 |
| 5,737,525 | 4/1998 | Picazo, Jr. et al. ..................... | 370/401 |
| 5,777,994 | 7/1998 | Takihiro et al. ........................ | 370/401 |

OTHER PUBLICATIONS

Link Services Architecture Reference Model, IBM Technical Disclosure Bulletin, vol. 34, No. 7B, Dec. 1991.
Addressing Source Routing in an ATM Emulated LAN, IBM Technical Disclosure Bulletin, vol. 37, No. 10, Oct. 1994.
Method for Improving Network Availability with Redundant Network Servers, IBM Technical Disclosure Bulletin, vol. 39, No. 8, Aug. 1996.

Primary Examiner—Huy D. Vu
Assistant Examiner—Chiho Andrew Lee
Attorney, Agent, or Firm—John J. Timar

[57] ABSTRACT

An ELAN having redundant default gateways is attached to an asynchronous transfer mode (ATM) communications network. The ELAN's redundant default gateways are comprised of a first and second routers. The first router is associated with a primary default gateway and the second router is associated with a backup default gateway. Both the primary and backup default gateways are connected to the ELAN and both the primary and backup default gateways are configured with a default gateway IP address and associated MAC address. Initially, the primary default gateway registers the default gateway MAC address, thereby becoming the active default gateway. While the primary default gateway is active, the backup default gateway continually attempts to register the default gateway MAC address. When the primary default gateway fails, the backup default gateway will be able to successfully register the default gateway MAC address and take over the responsibilities of the primary default gateway and become the active default gateway.

21 Claims, 4 Drawing Sheets

REDUNDANT INTERNET PROTOCOL GATEWAYS USING LOCAL AREA NETWORK EMULATION

BACKGROUND OF THE INVENTION

1. Technical Field

The present invention relates generally to transmitting data over emulated local area networks (ELANs) using internet protocol (IP), where the ELANs are implemented on an asynchronous transfer mode (ATM) network. More specifically, the present invention relates to creating redundant default gateways for the ELANs.

2. Description of the Related Art

Due to the widespread acceptance of the current IP standard for communicating data, this standard has been adapted for use with ATM devices. Currently, one standard solution for sending IP traffic over an ATM interface is specified by the Internet Engineering Task Force (IETF) and is described by M. Laubach in a document entitled "Classical IP and ARP over ATM," RFC 1577, Hewlett Packard Laboratories, January 1994. Also, due to the large installed base of traditional local area network (LAN) products, standards have been created which allow existing LAN applications to communicate data over ATM networks. See ATM Forum "LAN Emulation over ATM: Version 1.0 Specification," AF-LANE-0021.000, January 1995.

A problem existing with today's ELANs which use IP is the lack of flexible backup gateways. In current systems, end stations attached to a router via LAN emulation (LANE) can either run a routing protocol to determine the next hop for packets destined for subnets not directly connected to the end station, or the system administrator can specify the next hop by configuring a default-gateway. The system administrator can configure a default gateway on the end station by specifying the IP address of a router interface on the ELAN. If the system administrator has configured a default gateway and the default gateway's interface is down, the end station will not be able to forward packets out of its own subnet.

Therefore, it would be desirable to have a backup default gateway which would automatically start passing packets to other subnets in the event the primary default gateway failed. The switch from the primary default gateway to the backup default gateway should be transparent to end stations and should occur automatically in the event the primary default gateway fails. Finally, it would be desirable to have the router interfaces associated with both the primary and backup default gateways be active simultaneously. This would allow routing protocols such as OSPF to learn the connectivity of the backup default gateway while the primary default gateway is still active.

SUMMARY OF THE INVENTION

Therefore, it is one objective of the present invention to provide flexible backup default gateways for end stations attached to emulated local area networks.

It is yet another objective of the present invention that the backup default gateway automatically become active in the event the primary default gateway fails. This switch from the primary default gateway to the backup default gateway should be transparent to end stations.

It is another objective of the present invention for the primary and backup default gateways to be active at the same time so that routing protocols can learn the connectivity of the default gateways.

The foregoing objectives are achieved as follows. An ELAN having redundant default gateways is attached to an asynchronous transfer mode (ATM) communications network. The ELAN's redundant default gateways are comprised of a first and second routers. The first router is associated with a primary default gateway and the second router is associated with a backup default gateway. Both the primary and backup default gateways are connected to the ELAN and both the primary and backup default gateways are configured with a default gateway IP address and associated MAC address. Initially, the primary default gateway registers the default gateway MAC address, thereby becoming the active default gateway. While the primary default gateway is active, the backup default gateway continually attempts to register the default gateway MAC address. When the primary default gateway fails, the backup default gateway will be able to successfully register the default gateway MAC address and take over the responsibilities of the primary default gateway and become the active default gateway.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
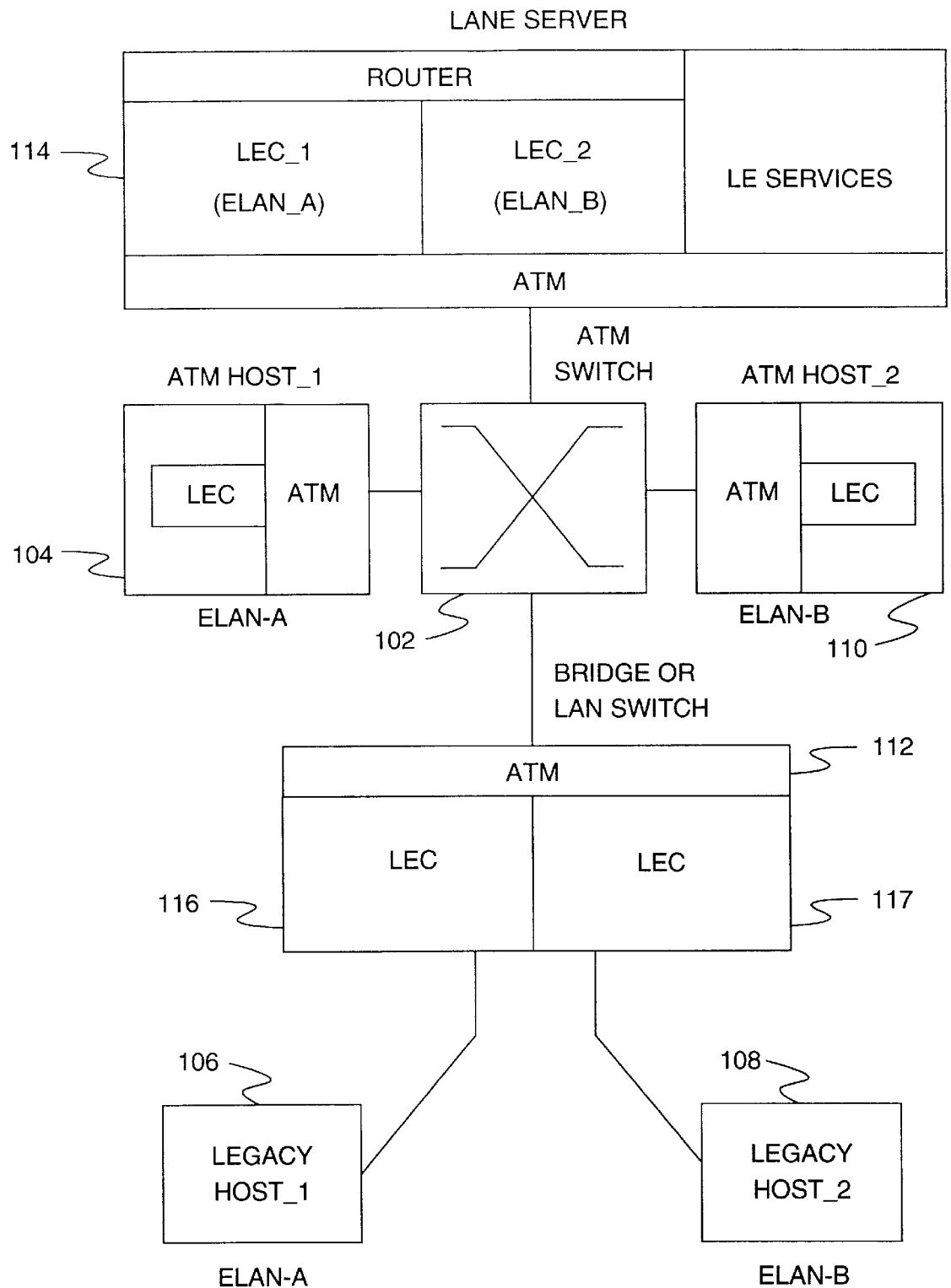
FIG. 1 illustrates the physical connections of an asynchronous transfer mode network having an emulated local area network.

FIG. 1 illustrates a prior art asynchronous transfer mode (ATM) network having an emulated local area network (ELAN). Attached to ATM switch 102 are: router 114, ATM host 104, ATM host 110, and LAN switch 112. ATM host 104 is an ATM device which has been configured to reside on ELAN_A. ATM host 110 is another ATM device which has been configured to reside on ELAN_B. LAN switch 112 contains an ATM interface and proxy LAN emulation clients (LECs) 116 and 117. Proxy LECs 116 and 117 are associated with ELAN_A and ELAN_B, respectively, and bridge communications from legacy hosts 106 and 108 to their respective ELANs. Legacy hosts 106 and 108 are traditional LAN devices which communicate with ATM switch 102 through proxy LECs 116 and 117.

Router 114 performs many services for ATM switch 102. One of the services provided by router 114 is routing traffic from ELAN_A to ELAN_B and vice versa.

Figure 2:
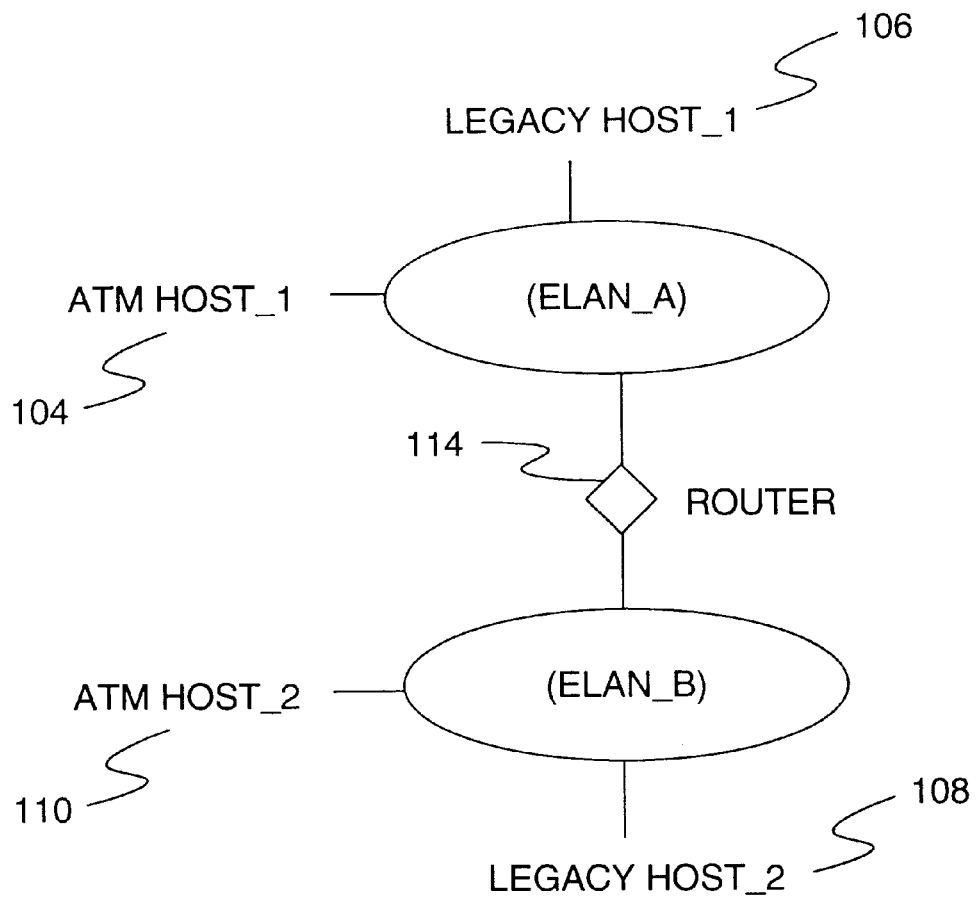
FIG. 2 depicts the logical connections of the network shown in FIG. 1.

FIG. 2 illustrates the logical connections of the network shown in FIG. 1. Attached to ELAN_A are ATM host 104 and legacy host 106. Likewise, attached to ELAN_B are ATM host 110 and legacy host 108. Routing traffic between ELAN_A and ELAN_B is router 114.

Figure 3:
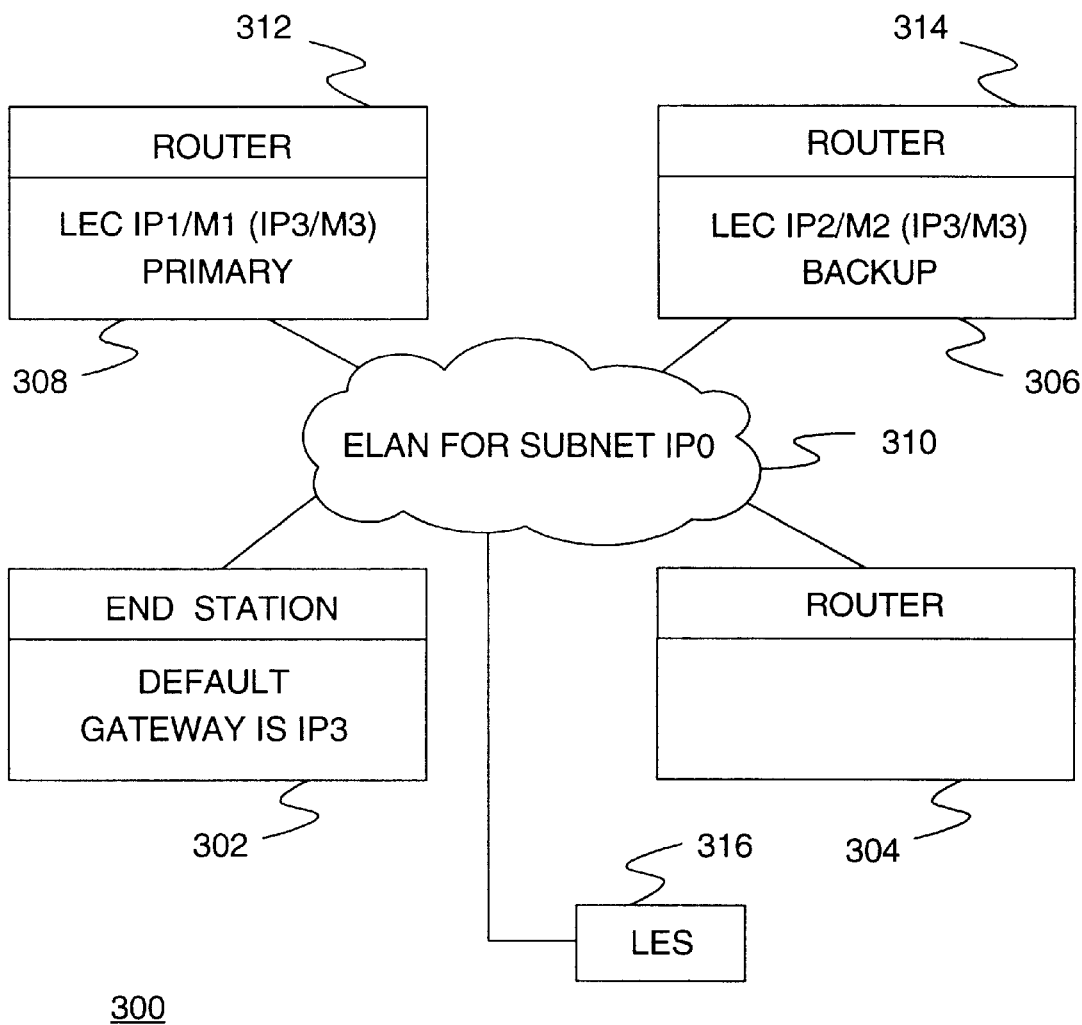
FIG. 3 illustrates a network according to the present invention.

FIG. 3 illustrates the logical connections of a network according to the present invention. In network 300, LECs 308 and 306 are connected to ELAN 310. LEC 308 provides an interface for the primary default gateway, while LEC 306 provides an interface for the backup default gateway. Also attached to ELAN 310 are end station 302 and router 304. Router 304's neighboring routers are routers 312 and 314 whose IP addresses are IP1 and IP2, respectively. In network 300, the system administrator has configured end station 302 to use a default gateway having an IP address of IP3.

LEC 308 has been assigned MAC address M1 and corresponding IP address IP1. LEC 306 has been configured with MAC address M2 and corresponding address IP2. Also, both LECs 308 and 306 have been configured with MAC address M3 and corresponding IP address IP3. IP addresses IP1 and IP2 and MAC addresses M1 and M2 are unique, while IP address IP3 and MAC address M3 are shared by LECs 308 and 306. LECs 308 and 306 only process packets addressed to M3/IP3 when their associated default gateway is active. Whether the primary or backup default gateway is active depends on whether the corresponding LEC has successfully registered its M3 MAC address with LAN emulation server (LES) 316. Only one default gateway will be active at a time because LES 316 does not allow the registration of duplicate MAC addresses.

When the LECs in routers 312 and 314 become active, they join ELAN 310 and register MAC addresses M1 and M2 with LES 316. LECs 308 and 306 also both attempt to register MAC address M3 with LES 316. Only LEC 308 or only LEC 306 will successfully register MAC address M3 since LES 316 does not allow registration of duplicate MAC addresses. The LEC which registers MAC address M3 becomes the active default gateway, while the LEC which fails to register MAC address M3 will periodically retry the registration of MAC address M3.

If LEC 308 registers MAC address M3 and the primary default gateway becomes active, LEC 306 will periodically try to reregister MAC address M3. By continually retrying to register MAC address M3, the backup default gateway can become the active default gateway when the primary default gateway fails. This type of operation is possible because when the active default gateway fails, LES 316 will deregister MAC address M3, thereby allowing another LEC to register this address.

If LEC 306 registers MAC address M3 before LEC 308, LEC 308 will also periodically try to reregister MAC address M3. In addition, LEC 308 will send LEC 306 a message instructing LEC 306 to deregister MAC address M3, thereby giving LEC 308 a chance to register MAC address M3 and to allow the primary default gateway to become active. This message is described in more detail below. The period of time in which LEC 308 waits before trying to reregister MAC address M3 is shorter than the corresponding period of time for LEC 306. This guarantees that once LEC 308 instructs LEC 306 to deregister MAC address M3, LEC 308 will have a chance to reregister this MAC address before LEC 306 does. In the preferred embodiment of the present invention, LEC 306 retries to register MAC address M3 every 30 seconds, while LEC 308 retries every 5 seconds.

The interface providing the active default gateway will now respond to address resolution protocol (ARP) requests and other packets addressed to IP address IP3. End stations with a manually configured default gateway address, such as end station 302, will use IP address IP3 to send packets to other subnets. These end stations will send ARP requests for the MAC address corresponding to IP address IP3. The interface providing the active default gateway will respond to these requests by returning MAC address M3. The end stations will then use MAC address M3 when transmitting packets destined for other subnets. Routers 312 and 314 will use the MAC/IP addresses M1/IP1 and M2/IP2, respectively, for all purposes except receiving packets intended for the active default gateway. For example, OSPF running on router 304 connected to ELAN 310 will use IP1 and IP2 to communicate with routers 312 and 314.

The primary default gateway will send a signal to the backup default gateway when the primary default gateway wishes to become the active default gateway. The backup default gateway could be active instead of a primary default gateway because it registered its M3 address with LES 316 before the primary default gateway did, or because the primary default gateway has failed. Initially, LEC 308 will try to register MAC address M3. If LEC 308 cannot register MAC address M3, it knows that LEC 306 has registered that address. LEC 308 will then send a message to LEC 306 using a private protocol. These messages are similar to the LANE LE_FLUSH messages. The differences between the messages sent by LEC 308 and the LANE LE_FLUSH Request message is that the messages sent by LEC 308 contain the MAC address of the default gateway in both the source LAN destination and target LAN destination fields; while the LANE LE_FLUSH Request messages contain zeros in the source LAN destination field. When LEC 306 receives the message from LEC 308, LEC 306 deregisters MAC address M3 from LES 316. After the MAC address M3 is deregistered by the backup default gateway, the primary default gateway will register MAC address M3. Now, when the backup default gateway tries to register MAC address M3, it will be unsuccessful because the primary default gateway has registered this address. However, the backup default gateway will continue to try to register MAC address M3 every 30 seconds. Continually trying to register MAC address M3 allows the backup default gateway to become the active default gateway within 30 seconds if the primary default gateway fails.

Figure 4:
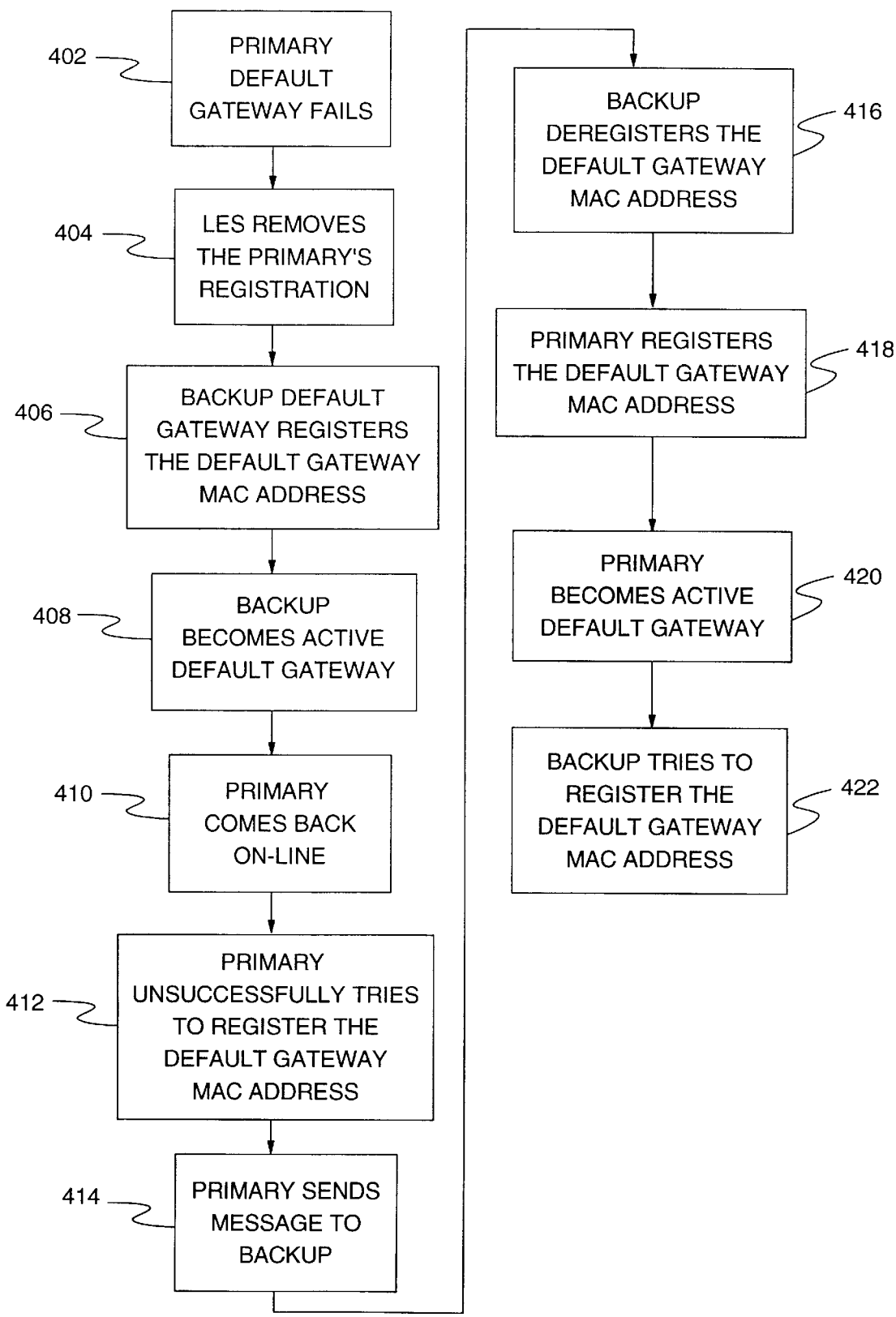
FIG. 4 is a flowchart which depicts the method whereby the backup default gateway becomes active when the primary default gateway fails.

FIG. 4 is a flowchart which illustrates how the backup default gateway becomes active when the primary default gateway fails. After the primary default gateway fails (402), the LES removes the primary's registration of the default gateway MAC address (404). Sometime later, the backup default gateway registers the default gateway MAC address (406). The backup default gateway periodically tries to register the default gateway MAC address, as it has no other way of knowing when the primary default gateway fails. In a preferred embodiment of the present invention, the backup default gateway attempts to register the default gateway MAC address every 30 seconds. The backup default gateway becomes active once it registers the default gateway MAC address (408). The backup default gateway has now assumed the responsibilities of the default gateway.

The primary default gateway may eventually come back on-line (410). After coming back on-line, the primary default gateway will try to register the default gateway MAC address with the LES (412). The primary's attempt to register the default gateway MAC address will be unsuccessful, however, because the backup default gateway has already registered this address. In response to this unsuccessful attempt to register the default gateway MAC address, the primary default gateway sends a message to the backup default gateway. This message informs the backup default gateway that the primary default gateway wishes to become active (414). Upon receiving this message, the backup default gateway deregisters the default gateway MAC address with the LES (416). With the backup default gateway deregistered, the primary default gateway will be able to register the default MAC gateway address with the LES upon its next attempt (418). The primary default gateway then becomes the active default gateway (420). After the primary default gateway becomes active, the backup default gateway will still periodically try to register the default gateway MAC address (422). The backup default gateway continues to retry this registration process so that when the primary default gateway fails, the backup default gateway will become active in a timely manner.

The examples shown above only describe ELANs with two backup default gateways attached. However, using the techniques described above, more than two backup default gateways can be attached to an ELAN in order to provide additional backup services.

While the invention has been particularly shown and described with reference to a preferred embodiment, it will be understood by those skilled in the art that various changes in form and detail may be made therein without departing from the spirit and scope of the invention.

We claim:

1. An asynchronous transfer mode (ATM) communications network including an emulated local area network (ELAN) having redundant default gateways, comprising:

a first router and a second router, said first router being associated with a primary default gateway and said second router being associated with a backup default gateway, wherein said primary default gateway and said backup default gateway are connected to said ELAN and configured with a default gateway internet protocol (IP) address and a default gateway media access control (MAC) address;

said default gateways being operable in a first mode of operation, wherein said primary default gateway registers said default gateway MAC address, thereby becoming an active default gateway;

said backup default gateway attempts to register said default gateway MAC address; and said backup default gateway waits for a period of time and attempts to register said default gateway MAC address, said attempt by said backup default gateway to register said default gateway MAC address being unsuccessful while said primary default gateway is an active default gateway.

2. The communications network as defined in claim 1, said default gateways being operable in a second mode of operation, wherein:

said primary default gateway fails;

a LAN emulation server (LES) deregisters said default gateway MAC address; and said backup default gateway registers said default gateway MAC address, such that said backup default gateway becomes said active default gateway.

3. The communications network as defined in claim 1, said default gateways being operable in a third mode of operation, wherein:

said primary default gateway unsuccessfully attempts to register said default gateway MAC address;

said primary default gateway sends said backup default gateway a message to deregister said default gateway MAC address; and said primary default gateway registers said default gateway MAC address, thereby becoming said active default gateway.

4. The communications network as defined in claim 1, wherein said first router and said second router are each configured with an IP address and a MAC address in addition to said default gateway IP address and said default gateway MAC address.

5. The communications network as defined in claim 4, wherein said first and second routers use said additional IP and MAC addresses for all communications except for receiving packets intended for said active default gateway.

6. The communications network as defined in claim 1, further comprising:

an additional router, said additional router being associated with a backup default gateway.

7. The communications network as defined in claim 3, wherein said third mode of operation further includes:

said primary default gateway waiting for a period of time before attempting to reregister said default gateway MAC address after sending said backup default gateway a message to deregister said default gateway MAC address, wherein the period of time which said primary default gateway waits before attempting to reregister said default gateway MAC address when said primary default gateway is not active is less than the period of time said backup default gateway waits before attempting to reregister said default gateway MAC address when said backup default gateway is not active.

8. The communications network as defined in claim 7, wherein said primary default gateway waits for 5 seconds before attempting to reregister said default gateway MAC address when not the active default gateway, and said backup default gateway waits for 30 seconds before attempting to reregister said default gateway MAC address when not the active default gateway.

9. A method of communicating using an asynchronous transfer mode (ATM) communications network including an emulated local area network (ELAN), having redundant default gateways, said method comprising the steps of:

providing a first router and a second router, said first router being associated with a primary default gateway and said second router being associated with a backup default gateway, wherein said primary default gateway and said backup default gateway are connected to said ELAN and configured with a default gateway internet protocol (IP) address and a default gateway media access control (MAC) address;

registering said default gateway MAC address, using the primary default gateway, thereby making the primary default gateway an active default gateway;

attempting to register said default gateway MAC address using said backup default gateway;

waiting for a period of time; and attempting to register said default gateway MAC address using said backup default gateway, wherein said attempt by said backup default gateway to register said default gateway MAC address is unsuccessful while said primary default gateway is an active default gateway.

10. The method as defined in claim 9, further comprising the steps of:

deregistering said default gateway MAC address in response to a failure of said primary default gateway;

registering said default gateway MAC address using said backup default gateway upon the next attempt by said backup default gateway to reregister the default gateway MAC address, such that said backup default gateway becomes said active default gateway.

11. The method as defined in claim 9, further comprising the steps of:
  unsuccessfully attempting to register said default gateway MAC address using said primary default gateway;
  sending a message from said primary default gateway to said backup default gateway to deregister said default gateway MAC address; and
  registering said default gateway MAC address using said primary default gateway, such that said primary default gateway becomes said active default gateway.

12. The method as defined in claim 9, wherein said first router and said second router are each configured with an IP address and a MAC address in addition to said default gateway IP address and said default gateway MAC address.

13. The method as defined in claim 12, wherein said first and second routers use said additional IP and MAC addresses for all communications except for receiving packets intended for said active default gateway.

14. The method as defined in claim 9, further comprising the steps of:
  providing an additional router, said additional router being associated with a backup default gateway.

15. The method as defined in claim 11, further comprising the steps of:
  in response to said sending step, waiting for a period of time before attempting to reregister said default gateway MAC address using said primary default gateway, wherein the period of time which said primary default gateway waits before attempting to reregister said default gateway MAC address when said primary default gateway is not active is less than the period of time said backup default gateway waits before attempting to reregister said default gateway MAC address when said backup default gateway is not active.

16. The method as defined in claim 15, wherein said primary default gateway waits for 5 seconds before attempting to reregister said default gateway MAC address when not the active default gateway, and said backup default gateway waits for 30 seconds before attempting to reregister said default gateway MAC address when not the active default gateway.

17. An emulated local access network (ELAN) having redundant default gateways, said ELAN comprising:
  an end station;
  a first router;
  a second router;
  means for associating said first router with a primary default gateway;
  means for associating said second router with a backup default gateway;
  means for configuring said first router and said second router to include a unique address pair and a shared address pair, wherein each said address pair includes a network address and a media access control address;
  means for registering said shared media access control address on behalf of said first router such that said primary default gateway becomes an active default gateway;
  means for periodically attempting to register said shared media access control address on behalf of said second router such that said backup default gateway may become said active default gateway in response to a failure of said primary default gateway; and
  means for configuring said end station to include said shared network address such that said end station may transmit data from said ELAN utilizing said active default gateway.

18. The ELAN as defined in claim 17, wherein said shared network address comprises a default gateway internet protocol address and said shared media access control address comprises a default gateway media access control address.

19. The ELAN as defined in claim 17, further comprising:
  means for deregistering said shared media access control address such that said primary default gateway is no longer said active default gateway in response to a failure of said primary default gateway.

20. The ELAN as defined in claim 19, said means for registering said shared media access control address on behalf of said first router further comprising:
  means for sending a message to said backup default gateway in response to a registration of said shared media access control address on behalf of said backup default gateway to deregister said shared media access control address; and
  means for periodically attempting to reregister said shared media access control address on behalf of said first router such that said primary default gateway may become said active default gateway.

21. The ELAN as defined in claim 20, wherein the period of time which said primary default gateway waits before attempting to reregister said shared media access control address is less than the period of time said backup default gateway waits before attempting to register said shared media access control address.

* * * * *

UNITED STATES PATENT AND TRADEMARK OFFICE
CERTIFICATE OF CORRECTION

PATENT NO  : 5,950,753
DATED      : September 14, 1999
INVENTOR(S): Muldoon et al.

It is certified that error appears in the above-identified patent and that said Letters Patent are hereby corrected as shown below:

In the Inventor section, please change "Patrick J. Muldoon" to --Patrick T. Muldoon--.

Signed and Sealed this

Tenth Day of April, 2001

Attest:

NICHOLAS P. GODICI

*Attesting Officer*   *Acting Director of the United States Patent and Trademark Office*